United States Patent
Goode et al.

(10) Patent No.: US 11,267,918 B2
(45) Date of Patent: Mar. 8, 2022

(54) METHODS FOR CONTROLLING POLYMER PROPERTIES

(71) Applicant: Univation Technologies, LLC, Houston, TX (US)

(72) Inventors: Mark G. Goode, South Charleston, WV (US); Francois Alexandre, Saint-Leonard (CA); Kevin J. Cann, Tierra Verde, FL (US); Barbara J. Kopp, Middlesex, NJ (US); William A. Matthews, Hilton Head Island, SC (US); John H. Moorhouse, Middlesex, NJ (US); Cliff R. Mure, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 392 days.

(21) Appl. No.: 16/241,602

(22) Filed: Jan. 7, 2019

(65) Prior Publication Data
US 2019/0161568 A1 May 30, 2019

Related U.S. Application Data

(62) Division of application No. 15/037,548, filed as application No. PCT/US2014/057427 on Sep. 25, 2014, now Pat. No. 10,227,428.
(Continued)

(51) Int. Cl.
*C08F 210/16* (2006.01)
*C08L 23/08* (2006.01)

(52) U.S. Cl.
CPC ............ *C08F 210/16* (2013.01); *C08L 23/08* (2013.01)

(58) Field of Classification Search
CPC .......... C08F 210/16; C08F 4/025; C08L 23/08
See application file for complete search history.

(56) References Cited

U.S. PATENT DOCUMENTS

| 6,646,069 B2 | 11/2003 | Monoi et al. |
| 8,101,691 B2 | 1/2012 | Goode et al. |
| (Continued) | | |

FOREIGN PATENT DOCUMENTS

| JP | 2006241257 | 9/2006 |
| JP | 2011006588 | 1/2011 |
| WO | 01/87997 | 11/2001 |

OTHER PUBLICATIONS

International Search Report and Written Opinion for related PCT Application PCT/US2014/057427, dated Jun. 2, 2015 (16 pgs).
(Continued)

*Primary Examiner* — Catherine S Branch
(74) *Attorney, Agent, or Firm* — Brooks, Cameron & Huebsch, PLLC

(57) ABSTRACT

Disclosed herein are methods of controlling polymer properties in polymerization processes that use a chromium-based catalyst. An embodiment discloses a method of producing a polyolefin comprising: contacting a reaction mixture and a reduced chromium oxide catalyst in a gas-phase reactor to produce the polyolefin, wherein the reaction mixture comprises a monomer and a co-monomer; and changing a reaction temperature in the gas-phase reactor by about 1° C. or more whereby a gas molar ratio of the co-monomer to the monomer is changed by about 2% or more and a co-monomer content of the polyolefin at substantially constant density is changed by about 2% or more. Additional methods and compositions are also provided.

19 Claims, 5 Drawing Sheets

Related U.S. Application Data

(60) Provisional application No. 61/917,220, filed on Dec. 17, 2013, provisional application No. 61/907,272, filed on Nov. 21, 2013.

(56) References Cited

U.S. PATENT DOCUMENTS

| | | |
|---|---|---|
| 8,420,754 B2 | 4/2013 | Cann et al. |
| 8,497,329 B2 | 7/2013 | Kolb et al. |
| 8,981,021 B2 | 3/2015 | Eisinger et al. |
| 2004/0225098 A1 | 11/2004 | Kuhlberger et al. |
| 2010/0069585 A1 | 3/2010 | Bodart et al. |
| 2011/0218307 A1 | 9/2011 | Goode et al. |
| 2011/0237763 A1 | 9/2011 | Goode et al. |

OTHER PUBLICATIONS

Second Written Opinion for related PCT Application PCT/US2014/057427, dated Dec. 23, 2015 (5 pgs).
International Preliminary Report on Patentability for related PCT Application PCT/US2014/057427, dated Mar. 15, 2016 (10 pgs).

METHODS FOR CONTROLLING POLYMER PROPERTIES

This application is a Divisional Application of US National Stage Application Number 15/037,548 filed May 18, 2016 and published as U.S. Publication No. 2016/0297907 A1 on Oct. 13, 2016, which is a U.S.C. § 371 of International Application Number PCT/US2014/057427, filed Sep. 25, 2014 and published as WO 2015/076928 A2 on May 28, 2015, which claims the benefit to both U.S. Provisional Application 61/907,272, filed Nov. 21, 2013, and U.S. Provisional Application 61/917,220, filed Dec. 17, 2013 the entire contents of which are both incorporated herein by reference in their entirety.

FIELD

Embodiments generally relate to methods for controlling polymer properties. More particularly, embodiments disclosed herein relate to methods of controlling polymer properties in polymerization processes that use a reduced chromium oxide catalyst.

BACKGROUND

In the gas-phase process for production of polyolefins, a gaseous alkene (e.g., ethylene), hydrogen, co-monomer and/or other raw materials may be converted to solid polyolefin (e.g., polyethylene) product. Generally, gas-phase reactors may include a fluidized-bed reactor, a compressor, and a cooler (heat exchanger). The reaction may be maintained in a two-phase fluidized bed of granular polyolefin and gaseous reactants by the fluidizing gas which is passed through a distributor plate near the bottom of the reactor vessel. Catalyst may be added to the fluidized bed. Heat of reaction may be transferred to the circulating gas stream. This gas stream may be compressed and cooled in the external recycle line and then is reintroduced into the bottom of the reactor where it passes through a distributor plate. Make-up feed streams may be added to maintain the desired reactant concentrations.

The properties of the polyolefin formed by such a process can be controlled to some extent by varying the operating conditions, including the operating temperature, co-monomer type and amount, type and quantity of catalyst, etc. Such properties include the molecular weight of the polyolefin, the molecular weight distribution of the polymer product, polymer density and the flow index of the polymer product. Mechanical properties that can be important for polyolefin include, for example, its impact resistance and environmental stress cracking resistance (ESCR), among others. In some cases, it has been found that the impact resistance and ESCR for polyolefins catalyst with chromium-based catalyst may run contrary to one another. In other words, increasing the impact resistance will result in reduced ESCR while decreasing the impact resistance will result in increased ESCR. Thus, it may be difficult to obtain a good balance between impact resistance and ESCR, particularly with chromium-based catalysts. Accordingly, improved methods of controlling polymer properties to achieve a desired balance between impact resistance and ESCR would be desirable and advantageous.

SUMMARY

Disclosed herein is an example method of producing a polyolefin comprising contacting a reaction mixture and a reduced chromium oxide catalyst in a gas-phase reactor to produce the polyolefin, wherein the reaction mixture comprises a monomer and a co-monomer; and changing a reaction temperature in the gas-phase reactor by about 1° C. or more whereby a gas molar ratio of the co-monomer to the monomer is changed by about 2% or more and a co-monomer content of the polyolefin at substantially constant density is changed by about 2% or more.

Also disclosed herein in an example method of producing a polyolefin comprising contacting a reaction mixture and a reduced chromium oxide catalyst in a gas-phase reactor to produce the polyolefin, wherein the reaction mixture comprises ethylene and a co-monomer, and wherein the polyolefin is characterized by (i) a modified-Charpy impact strength of about 20 kJ/m$^2$ or more and (ii) an ESCR of about 50 hours or more as determined by notched constant ligament stress (nCLS).

Also disclosed herein is a composition comprising a reduced chromium oxide-catalyzed polyolefin, wherein the reduced chromium oxide-catalyzed polyolefin is characterized by (i) a modified-Charpy impact strength of about 22 kJ/m$^2$ or more and (ii) an equivalent stress cracking resistance of about 30 hours or more as determined by determined by nCLS.

Also disclosed herein is a composition comprising a reduced chromium oxide-catalyzed polyolefin, wherein the reduced chromium oxide-catalyzed polyolefin is characterized by (i) a modified-Charpy impact strength of about 20 kJ/m$^2$ or more and (ii) an equivalent stress cracking resistance of about 50 hours or more determined by nCLS.

BRIEF DESCRIPTION OF THE DRAWINGS

The drawing illustrates certain aspects of the disclosed embodiments and should not be used to limit or define the invention.

DETAILED DESCRIPTION

Figure 1:
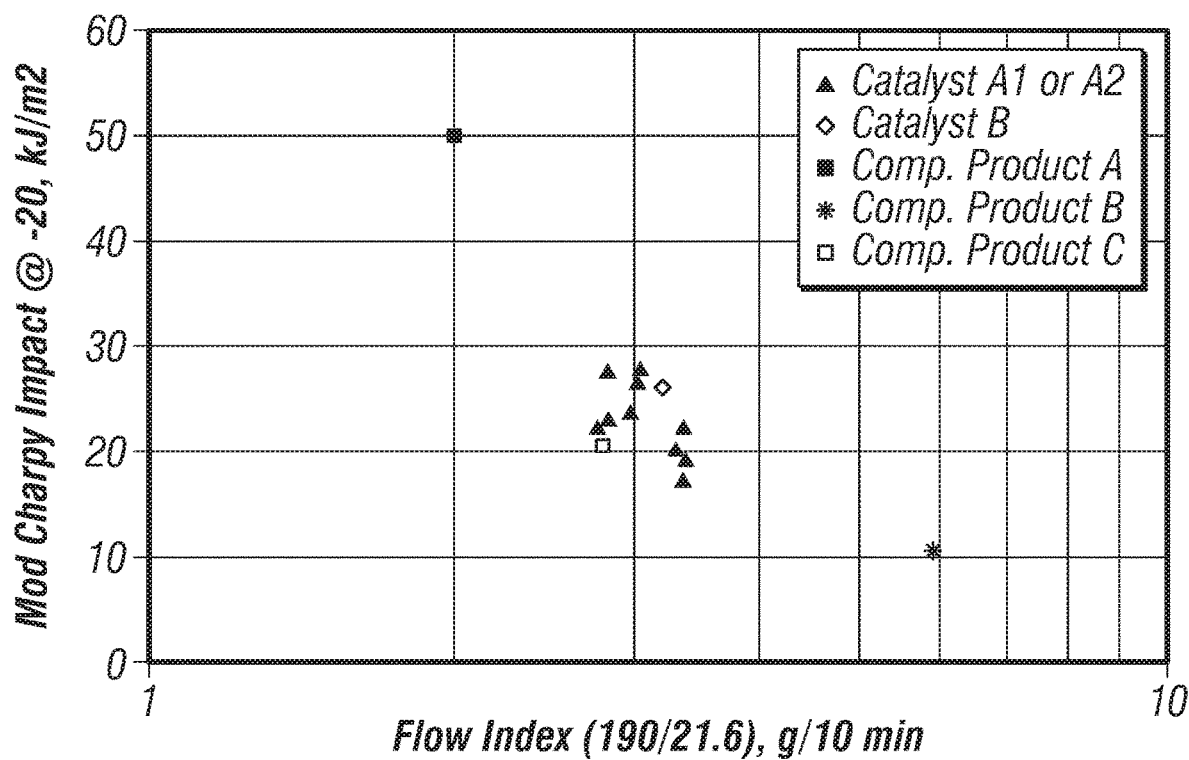
FIG. 1 is a plot of modified-Charpy impact strengths versus flow index for certain embodiments in a gas-phase reactor.

Before the present compounds, components, compositions, and/or methods are disclosed and described, it is to be understood that unless otherwise indicated this invention is not limited to specific compounds, components, compositions, reactants, reaction conditions, ligands, catalyst structures, or the like, as such may vary. It is also to be understood that the terminology used herein is for the purpose of describing particular embodiments only and is not intended to be limiting.

Embodiments of the present techniques are directed to controlling polymer properties in polymerization processes that use a reduced chromium oxide based catalyst. In some embodiments, a polymer may be formed in a gas-phase process using a reduced chromium oxide-based catalyst, wherein reactor temperature is used to control the gas molar ratio of co-monomer to ethylene. For example, the reactor temperature may be increased to achieve a lower gas molar ratio while reactor temperature may be decreased to achieve a higher gas molar ratio. In some embodiments, the reactor temperature may be changed (+/−) about 1° C. or more to achieve a change (+/−) in the co-monomer gas molar ratio of about 2% or more and a change (+/−) in the co-monomer content of the polymer of about 2% or more. These changes in the co-monomer gas molar ratio and polymer co-monomer content may be achieved by controlling temperature without substantially changing the polymer's density. The term "substantially" as used herein with respect to changing the polymer's density means that the density change (+/−) is less than 0.0005 g/cm$^3$ in some embodiments, less than 0.0003 g/cm$^3$ in other embodiments, less than about 0.0002 g/cm$^3$ in other embodiments, and less than 0.0001 g/cm$^3$ in yet other embodiments. Because the co-monomer gas molar ratio and the resulting polymer co-monomer content can strongly influence both the modified-Charpy impact strength and ESCR, polymers having desired impact resistance and ESCR can be produced. In some embodiments, a polymer may be formed that is characterized by (i) a modified-Charpy impact strength of about 20 kJ/m$^2$, about 22 kJ/m$^2$, about 25 kJ/m$^2$ or greater and (ii) an nCLS-indication of ESCR of about 30 hours, about 40 hours, about 50 hours, about 60 hours, about 70 hours, or longer. In other embodiments, a polymer may be formed that is characterized by (i) a modified-Charpy impact strength of about 22 kJ/m$^2$ to 24 kJ/m$^2$ and (ii) an nCLS-indication of ESCR of about 30 hours to 40 hours or longer.

Catalysts

Useful catalyst and catalyst systems for use in embodiments of present techniques for controlling polymer properties may include reduced chromium oxide catalysts. To form the reduced chromium oxide catalysts, a chromium-based catalyst may be reduced with a reducing agent.

The chromium compounds used to prepare reduced chromium oxide catalysts may include $CrO_3$ or any compound convertible to $CrO_3$ under the activation conditions employed. Many compounds convertible to $CrO_3$ are disclosed in U.S. Pat. Nos. 2,825,721, 3,023,203, 3,622,251, and 4,011,382 and include chromic acetyl acetonate, chromic halide, chromic nitrate, chromic acetate, chromic sulfate, ammonium chromate, ammonium dichromate, or other soluble, chromium containing salts. Chromium oxide catalysts, for example, Philips-type catalysts, may be formed by a process that includes impregnating a $Cr^{+3}$ species into silica, followed by calcination of the silica support under oxidizing conditions at about 300° C. to about 900° C., and, alternatively, at about 400° C. to about 860° C. Under these conditions, at least some of the $Cr^{+3}$ may be converted to $Cr^{+6}$. The Philips-type catalyst is commonly referred to as an "inorganic oxide-supported $Cr^{+6}$."

In some embodiments, a chromium-based catalyst, including a supported chromium-based catalyst, may be contacted with a reducing agent. Reducing agents used may include organoaluminum compounds such as aluminum alkyls and alkyl aluminum alkoxides. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide and mixtures thereof. Although the examples almost exclusively use diethyl aluminum ethoxide (DEAlE), it should be understood that the disclosure is not so limited. In the examples that follow, where DEAlE is used, other aluminum alkyls or other alkyl aluminum alkoxides, or mixtures thereof may be used.

U.S. Pat. No. 7,504,467 teaches the use of aluminum alkyl activators and co-catalysts to improve the performance of reduced chromium oxide catalysts. The addition of aluminum alkyls allow for variable control of side branching, and desirable productivities, and these compounds may be applied to the catalyst directly or added separately to the reactor. Adding the aluminum alkyl compound directly to the polymerization reactor (in-situ) may eliminate induction times.

Reduced chromium oxide catalysts and methods of preparation thereof, as well as characteristics of the polymer products formed therefrom, are described in more detail in U.S. Pat. No. 6,989,344 and U.S. Patent Application Publication No. 2011/0010938.

In some embodiments, supported chromium compounds, such as, for example, chromium acetate, that are commercially available may also be used. Commercial sources include the Davison Chemical Division of W.R. Grace and Company which markets chromium on silica support materials under trade names such as Davison 957, Davison 957HS, or Davison 957BG, and PQ Corporation, which markets chromium on silica support materials under trade names such as ES370. The chromium on silica support may in the form of spherical particles, which are obtained by a spray-drying process. Alternatively, PQ Corporation markets silica support materials under trade names such as C35100MS and C35300MS which are not spray-dried. As procured, all of these silicas are not activated. However, if available, chromium supported on silica that is activated prior to purchase may be used in catalysts of particular embodiments Activation of the supported chromium oxide catalyst in some embodiments can be accomplished at nearly any temperature from about 300° C. up to the temperature at which substantial sintering of the support takes place. For example, activated catalysts may be prepared in a fluidized-bed, as follows. The passage of a stream of dry air or oxygen through the supported reduced chromium oxide catalyst during the activation aids in the displacement of any water from the support and converts, at least partially, chromium species to $Cr^{+6}$.

Temperatures used to activate the chromium oxide catalysts are often high enough to allow rearrangement of the chromium compound on the support material. Peak activation temperatures of from about 300° C. to about 900° C. for periods of from greater than 1 hour to as high as 48 hours are acceptable. In some embodiments, the supported chromium oxide catalysts are activated at temperatures from about 400° C. to about 850° C., from about 500° C. to about 700°

C., and from about 550° C. to about 650° C. Exemplary activation temperatures are about 600° C., about 700° C., and about 800° C. Selection of an activation temperature may take into account the temperature constraints of the activation equipment. In some embodiments, the supported chromium oxide catalysts are activated at a chosen peak activation temperature for a period of from about 1 to about 36 hours, from about 3 to about 24 hours, and from about 4 to about 6 hours. Exemplary peak activation times are about 4 hours and about 6 hours. Activation is typically carried out in an oxidative environment; for example, well dried air or oxygen is used and the temperature is maintained below the temperature at which substantial sintering of the support occurs. After the chromium compounds are activated, a powdery, free-flowing particulate chromium oxide catalyst is produced.

Once activated, the supported chromium oxide catalyst composition may then be slurried in a non-polar solvent, in some embodiments, prior to the addition of the reducing agent. Embodiments of the chromium oxide catalysts may then be contacted with a reducing agent, such as those described above, including organoaluminum compounds such as aluminum alkyls and alkyl aluminum alkoxides.

In some embodiments, a silyl chromate compound may be added to the activated supported chromium oxide catalyst. The silyl chromate compounds disclosed herein may include bis-tri$^e$thylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are disclosed, for example, in U.S. Pat. Nos. 3,324,101, 3,704,287, and 4,100,105, among others. In some embodiments, bis-triphenylsilyl chromate, bis-tritolylsilyl chromate, bis-trixylylsilyl chromate, and bis-trinaphthylsilyl chromate may be used. In other embodiments, bis-triphenylsilyl chromate may be used.

In various embodiments, the selected agitation rate may be less than 70 rpm and the selected reducing agent addition time may be less than 20 minutes. In other embodiments, the selected agitation rate may be greater than 70 rpm and the selected reducing agent addition time may be less than 20 minutes. In other embodiments, the selected agitation rate may be greater than 70 rpm and the selected reducing agent addition time may be greater than 20 minutes. In other embodiments the selected agitation rate may be in the range of about 30 rpm to 50 rpm, and the selected reducing agent addition time may be in the range of about 20 minutes to 80 minutes.

After addition of the reducing agent followed by a suitable period of time to allow for reaction, such as 0 to 2 hours, the catalyst slurry is heated further to remove the non-polar solvent. The drying process results in the slurry transitioning from a viscous slurry to a partially dried slurry or mud to a free-flowing powder. Accordingly, helical ribbon agitators may be used in vertical cylindrical blenders to accommodate the varying mixture viscosities and agitation requirements. The agitators may have single or double helical ribbons and may optionally include a central shaft auger or other more complex secondary agitator. Drying may be conducted at pressures above, below, or at normal atmospheric pressure as long as contaminants such as oxygen are strictly excluded. Drying temperatures may range from 0° C. to as much as 100° C. In some embodiments drying temperatures from about 40° C. to about 85° C. may be used. In some embodiments drying temperatures from about 55° C. to about 75° C. may be used. Drying times may range from about 1 hour to about 48 hours. In some embodiments drying times from about 3 hours to about 26 hours may be used. In some embodiments drying times from 5 hours to about 20 hours may be used. Following the drying process, the catalyst may be stored under an inert atmosphere until use.

In some embodiments, the chromium compound used to produce a chromium oxide catalyst may be deposited onto conventional catalyst supports or bases, for example, inorganic oxide materials. The term "support," as used herein, refers to any support material, a porous support material in one exemplary embodiment, including inorganic or organic support materials. In some embodiments, desirable carriers may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of support materials include inorganic oxides such as silica, alumina, titania, zirconia, thoria, as well as mixtures of such oxides such as, for example, silica-chromium, silica-alumina, silica-titania, and the like.

The inorganic oxide materials which may be used as a support in the catalyst compositions of particular embodiments are porous materials having variable surface area and particle size. In some embodiments, the support may have a surface area in the range of about 50 $m^2/g$ to about 1000 $m^2/g$, and an average particle size of about 20 micrometers to about 300 micrometers. In some embodiments, the support may have a pore volume of about 0.5 $cm^3/g$ to about 6.0 $cm^3/g$ and a surface area of about 200 $m^2/g$ to about 600 $m^2/g$. In other embodiments, the support may have a pore volume of about 1.1 $cm^3/g$ to about 1.8 $cm^3/g$ and a surface area of about 245 $m^2/g$ to about 375 $m^2/g$. In some other embodiments, the support may have a pore volume of about 2.4 $cm^3/g$ to about 3.7 $cm^3/g$ and a surface area of about 410 $m^2/g$ to about 620 $m^2/g$. In yet other embodiments, the support may have a pore volume of about 0.9 $cm^3/g$ to about 1.4 $cm^3/g$ and a surface area of about 390 $m^2/g$ to about 590 $m^2/g$. Each of the above properties may be measured using conventional techniques as known in the art.

In some embodiments, the support materials comprise silica, particularly amorphous silica, and most particularly high surface area amorphous silica. Such support materials are commercially available from a number of sources. Such sources include the Davison Chemical Division of W.R. Grace and Company which markets silica support materials under the trade names of Davison 952 or Davison 955, and PQ Corporation, which markets silica support materials under various trade designations, including ES70. The silica may be in the form of spherical particles, which are obtained by a spray-drying process. Alternatively, PQ Corporation markets silica support materials under trade names such as MS3050 which are not spray-dried. As procured, all of these silicas are not calcined (i.e., not dehydrated). However, silica that is calcined prior to purchase may be used in catalysts of particular embodiments.

Polymerization Processes

Embodiments of this disclosure for controlling polymer properties may be suitable for use in the polymerization of olefins using any type of gas-phase polymerization system known in the art. In some embodiments, the gas-phase polymerization may be carried out in a fluidized-bed reactor system. In alternative embodiments, the gas-phase polymerization may be carried out in a stirred- or paddle-type reactor system (e.g., stirred-bed systems) which may include solids in a gaseous environment. While the following discussing is directed to fluidized-bed systems, it should be understood that embodiments of the present technique may also be applicable to stirred- or paddle-type reactor systems as well. The present invention is not intended to be limited to any specific type of reactor system.

Generally, a conventional gas-phase, fluidized-bed process is conducted by passing a stream containing one or more olefin monomers continuously through a fluidized-bed reactor under reaction conditions and in the presence of a catalyst composition at a velocity sufficient to maintain a bed of solid particles in a suspended state. A stream containing unreacted monomer is continuously withdrawn from the reactor, compressed, cooled, optionally partially or fully condensed, and recycled back to the reactor. Product is withdrawn from the reactor and replacement monomer is added to the recycle stream. Gases inert to the catalyst composition and reactants may also be present in the gas stream. The polymerization system may comprise a single reactor or two or more reactors in series.

Feed streams may include olefin monomer, non-olefinic gas such as nitrogen and hydrogen, and may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. The feeds may enter the reactor at a single or multiple and different locations.

Further, the polymerization process may be conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv. Organometallic compounds may be employed as scavenging agents to remove catalyst poisons, thereby increasing the catalyst activity, or for other purposes. Examples of organometallic compounds that may be added include metal alkyls, such as aluminum alkyls. Conventional adjuvants may also be used in the process, provided they do not interfere with the mechanism of the catalyst composition in forming the desired polyolefin. In some embodiments, hydrogen gas may be added. The use of hydrogen affects the polymer molecular weight and distribution, and ultimately influences the polymer properties. For the purpose of polymerization with reduced chromium oxide catalysts of particular embodiments, the gas mole ratio of hydrogen to ethylene in the reactor may be from about 0 to about 0.5, from about 0.005 to about 0.4 and from about 0.01 to about 0.3.

An illustrative catalyst reservoir suitable for continuously feeding dry catalyst powder into the reactor is shown and described in U.S. Pat. No. 3,779,712, for example. A gas that is inert to the catalyst, such as nitrogen or argon, is preferably used to carry the catalyst into the bed. In another embodiment the catalyst is provided as a slurry in mineral oil or liquid hydrocarbon or mixture such, as for example, propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane.

In order to achieve the desired density ranges in the copolymers it may be necessary to copolymerize enough of the co-monomers with ethylene to achieve a level of about 0 to anywhere from 5 to 10 weight percent (wt %) of the co-monomer in the copolymer. The amount of co-monomer needed to achieve this result may depend on the particular co-monomer(s) being employed, the catalyst composition and particularly the molar ratio of aluminum to chromium, catalyst preparation conditions, and reactor temperature. The ratio of the co-monomer to ethylene may be controlled to obtain the desired resin density of copolymer product.

The co-monomer may be present at any level to achieve, for example, the desired polymer properties. The gas molar ratio of co-monomer to ethylene described herein is the ratio of the gas concentration of co-monomer moles in the cycle gas to the gas concentration of ethylene moles in the cycle gas. In one embodiment, the co-monomer is present with ethylene in the cycle gas in a gas molar ratio from about 0.0001 (co-monomer:ethylene) to 0.2, and from about 0.0002 to 0.1 in another embodiment, and from about 0.0004 to 0.05 in another embodiment, from about 0.0004 to 0.02 in another embodiment, and from about 0.00055 to 0.0016 in another embodiment. As previously mentioned, examples embodiments provide a method of controlling polymer properties by using temperature to control the gas molar ratio of co-monomer to ethylene.

To achieve a polymer density of about 0.952 g/cc to 0.955 g/cc typical for low flow index blow molding applications, the amount of hexene comonomer incorporated may typically be about 0.3 to 0.8 butyl branches per 1000 chain carbons or more typically about 0.4 to 0.7 butyl branches per 1000 chain carbons for polymers of particular embodiments. The corresponding concentration of hexene incorporated into the polymer may typically be about 0.18 wt % to 0.48 wt % (0.15 wt % to 0.50 wt % rounded) and more typically about 0.24 wt % to 0.42 wt %. To achieve a density of about 0.950 g/cc polymer density, the hexene comonomer incorporated may typically be about 0.8 to 1.2 butyl branches per 1000 chain carbons, that corresponds to a concentration of hexene incorporated into the polymer of about 0.48 wt % to 0.72% (0.50 wt % to 0.75 wt % rounded). The weight % of 1-butene comonomer incorporated may be approximately similar to that of 1-hexene to achieve an equivalent density.

In some exemplary embodiments, the processes and catalysts disclosed herein may be used to produce polyolefins such as ethylene/1-hexene copolymer or ethylene homopolymer under specific reactor conditions. For example, the $H_2/C_2$ gas molar ratio may be in the range of from about 0.01 to about 0.5 and, alternatively, from about 0.01 to about 0.2. Oxygen add back may be in the range of from about 10 ppbv to about 600 ppbv relative to the ethylene feed rate to the reactor and, alternatively, from about 10 ppbv to about 100 ppbv. The reactor operating temperature may be in the range of from about 70° C. to about 120° C. The reactor may be optionally run in the condensing mode, such as disclosed in U.S. Pat. Nos. 4,543,399 and 4,588,790, to assist in heat removal from the fluid-bed polymerization reactor.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize electrostatic charge generation. Liquid monomer in the bed can be practiced as disclosed in U.S. Pat. No. 6,627,713.

The conditions for polymerizations may vary depending upon the monomers, catalysts and equipment availability. The specific conditions are known or readily derivable by those skilled in the art.

In some embodiments, ethylene may be present in the reactor at a partial pressure of greater than about 100 psia (690 kPa), or about 120 psia (830 kPa), or about 190 psia (1300 kPa), or about 200 psia (1380 kPa), or about 210 psia (1450 kPa), or about 220 psia (1515 kPa), or about 240 psia (1655 kPa), or about 300 psia (2070 kPa), or even higher. The partial pressure of ethylene may be maintained at or above these values, for example, to maintain adequate catalyst productivity.

In some embodiments, the reactor may be operated at a temperature from about 70° C. to about 120° C. For example, the reactor may be operated a temperature of about 70° C., about 75° C., about 80° C., about 90° C., about 95° C., about 100° C., about 110° C., or about 115° C. The temperature may be used, for example, to control catalyst productivity and molecular weight distribution of the polymer.

In certain embodiments, the reactor temperature may also be used to control the gas molar ratio of co-monomer to ethylene. For example, the reactor temperature may be increased to achieve a lower gas molar ratio while reactor temperature may be decreased to achieve a higher gas molar ratio. In some embodiments, the reactor temperature may be changed (+/−) about 1° C. or more, about 2° C. or more, about 5° C. or more, or about 10° C. or more to achieve a change (+/−) in the gas molar ratio of co-monomer to ethylene of about 2% or more, 5% or more, about 10% or more, about 25% or more, about 50% or more, or about 100% or more. In an embodiment, polymers of equivalent flow index and density in the range of about 2.5 dg/min to 5 dg/min flow index and about 0.952 g/cc to 0.954 g/cc, may be prepared over a range of reaction temperatures from about 97° C. to 107° C., and the effect of increasing the reaction temperature by 1° C. may be to decrease the 1-hexene comonomer to ethylene molar ratio by about 0.00011 units on average. Based on an 1-hexene comonomer to ethylene gas molar ratio average of about 0.00098, in some embodiments, this may correspond to about a 11% decrease in the comonomer to ethylene gas molar ratio for a 1° C. increase in the reaction temperature at constant polymer flow index and density. Based on a possible range of 1-hexene comonomer to ethylene gas molar ratio of about 0.00055 to 0.0016 to achieve a density in the 0.952 g/cc to 0.954 g/cc range at about 2.5 dg/min to 5 dg/min flow index, the percentage decrease in comonomer to ethylene gas molar ratio for a 1° C. increase in reaction temperature may be in the range of about 5% to 25% or more typically about 7% to 20%. In some embodiments, the decrease in the comonomer to ethylene gas molar ratio may be as low as about 3% or about 2% in response to a 1° C. change in temperature. The percentage change in comonomer to ethylene gas mole ratio may be employed for polymers of lower and higher density to estimate the effect of reaction temperature. Similar percentage changes in comonomer to ethylene gas molar ratio may be expected with other comonomers including for example 1-butene.

In certain embodiments, the reactor temperature may also be used to control the amount of comonomer incorporated into the polymer at substantially constant density. For example, the reactor temperature may be increased to achieve lower comonomer content in the resin while reactor temperature may be decreased to achieve higher comonomer content in the resin. In some embodiments, the reactor temperature may be changed (+/−) about 1° C. or more, about 2° C. or more, about 5° C. or more, or about 10° C. or more to achieve a change (+/−) in the polymer comonomer content of about 2% or more, about 5% or more, about 10% or more, about 25% or more, about 50% or more, or about 100% or more. In an embodiment, polymers of equivalent flow index and density in the range of about 2.5 dg/min to 5 dg/min flow index and about 0.952 g/cc to 0.954 g/cc, may be prepared over a range of reaction temperatures from about 97° C. to 107° C., and the effect of increasing the reaction temperature by 1° C. is to decrease the 1-hexene comonomer content of the polymer by about 0.028 butyl branches per 1000 chain carbons on average. Based on a comonomer content average of about 0.055 butyl branches per 1000 chain carbons, in some embodiments, this may correspond to about a 5% decrease in comonomer content for a 1° C. increase in the reaction temperature at constant polymer flow index and density. In further embodiments, the response may be as high as about 0.033 butyl branches per 1000 chain carbons or as low as 0.017 butyl branches per 1000 chain carbons for the specified flow index and density range for a 1° C. increase in temperature. Based on a possible range of butyl branches from about 0.40 to 0.70 per 1000 chain carbons, in some embodiments, to achieve a density in the 0.952 g/cc to 0.954 g/cc range at about 2.5 dg/min to 5 dg/min flow index, the percentage decrease in comonomer content for a 1° C. increase in reaction temperature may be in the range of about 2.0% to 10% or more typically about 2.5% to 8.5%. The percentage change in comonomer content may be employed for polymers of lower and higher density to estimate the effect of reaction temperature. Similar percentage changes in comonomer content may be expected with other comonomers including for example 1-butene.

Because the gas molar ratio of co-monomer to ethylene and the resulting comonomer content of the polymer can strongly influence both modified-Charpy impact strength and ESCR, polymers having desired impact resistance and ESCR can be produced in accordance with certain embodiments. In some embodiments, the following statistical relationship between the the nCLS-indication of ESCR and modified-Charpy impact strength performance based on data regression may be used to characterize the polymers prepared with the catalysts and polymerization conditions of particular embodiments over a product flow index range of about 2.5 dg/min to 5 dg/min and a product density range of about 0.950 g/cc to 0.954 g/cc. The expression may be used to differentiate the polymers of particular embodiments from chromium-based large part blow molding (LPBM) products known to the art by defining an nCLS performance level based on measured values of flow index, density and modified-Charpy Impact Strength, where the nCLS observed either approximately matches the predicted nCLS or exceeds the predicted nCLS, achieves about 90% to 95% of the predicted nCLS, or achieves between about 90% to about 140% of the predicted nCLS, to partially account for statistical goodness of fit. The nCLS, which is an indication of the ESCR, may be measured at 900 psi actual and reported in units of hours. The modified-Charpy impact strength may be determined at −20° C. and is reported in units of kJ/m².

nCLS@900 psi actual,hr=24503.5−21.05×(flow index)−25415×(polymer density)−6.539×(modified-Charpy impact strength@−20° C.,kJ/m²)

In an embodiment, the ESCR measured by nCLS may have a strong inverse function of the polymer density that may also be affected by the reaction temperature by the following equation in a flow index range of about 2.5 dg/min to 5 dg/min and a product density range of about 0.950 g/cc to 0.954 g/cc. A 1° C. decrease in reaction temperature may result in about a 7 hour increase in the nCLS at substantially constant polymer density (with an estimated range of about 5 hours to 10 hours), that may be attributed to the increase in chain-branching comonomer content in the polymer at reduced temperature. The change in butyl branching with a 1° C. change may average about 0.055 per 1000 chain carbons or 5% with the ranges previous disclosed. The change in the 1-hexene comonomer to ethylene gas mole ratio with a 1° C. change may be on average about 0.00011 or 11% with the ranges previous disclosed. The approximate 7 hour increase in nCLS following a 1° C. degree decrease in reaction temperature may be directly related to the changes in the comonomer to ethylene gas mole ratio and the comonomer content of the polymer at constant density.

nCLS@900 psi actual,hr=34812.3−35721.1×(polymer density)−6.8790×(reaction temperature,° C.)

In changing the reactor temperature, other reactor variables, such as $H_2/C_2$ gas molar ratio, ethylene partial pressure, polymer residence time, and/or oxygen addition may be adjusted, for example, to maintain the target polymer properties (e.g., flow index). The oxygen gas ratio may itself have a small influence on the gas molar ratio of the co-monomer to ethylene to achieve the target density. In some embodiments, lower reactor temperatures may require a higher gas molar ratio of the co-monomer to ethylene and may need additional oxygen to maintain the flow index. In addition, the additional oxygen may further require slightly higher gas molar ratio of the co-monomer to ethylene in the gas phase.

Polymer Products

Embodiments of this disclosure for controlling polymer properties may be suitable for producing a broad range of polyolefins. In some embodiments of this disclosure, the polyolefins produced may include those made from olefin monomers such as ethylene and linear or branched higher alpha-olefin monomers containing from 3 to 20 carbon atoms. In other embodiments, homopolymers or interpolymers of ethylene and these higher alpha-olefin monomers. Exemplary higher alpha-olefin monomers may include, for example, propylene, 1-butene, 1-pentene, 1-hexene, 4-methyl-1-pentene, 1-octene, and 3,5,5-trimethyl-1-hexene. Exemplary polyolefins may include ethylene-based polymers (at least 50 mole % ethylene), including ethylene-1-butene, ethylene-1-hexene, and ethylene-1-octene copolymers, such as high density polyethylene (HDPE), medium density polyethylene (MDPE) (including ethylene-butene copolymers and ethylene-hexene copolymers), low density polyethylene (LDPE), linear low density polyethylene (LLDPE), or homopolyethylene.

In certain embodiments, the polymers may have an improved balance between impact properties and ESCR. As previously mentioned, this improved balance may be achieved, for example, by using reactor temperature to control the gas molar ratio of co-monomer to ethylene and the amount of comonomer incorporated into the polymer at substantially constant density, which can strongly influence both modified-Charpy impact strength and ESCR. Accordingly, polymers having a desired balance between impact resistance and ESCR can be produced in accordance with present embodiments. Higher reactor temperatures, lower gas molar ratio of co-monomer to ethylene, and lower concentrations of comonomer in the polymer at substantially constant density may improve impact properties, while lower reactor temperatures, higher gas molar ratios of co-monomer to ethylene and higher concentrations of comonomer in the polymer at constant density may improve ESCR. In some embodiments, a polymer may be formed that is characterized by (i) a modified-Charpy impact strength of 20 kJ/m² or greater and (ii) an ESCR of about 50 hours or longer as determined by nCLS. In particular embodiments, the polymer may have a modified-Charpy impact strength of about 20 kJ/m², about 22 kJ/m², about 25 kJ/m² or greater. In particular embodiments, the polymer may have an ESCR of about 30 hours, about 40 hours, about 50 hours, about 60 hours, about 70 hours, or longer as determined by nCLS. In another embodiment, the reduced chromium oxide-catalyzed polyolefin may characterized by (i) a modified-Charpy impact strength of about 22 to 24 kJ/m² or more and (ii) an ESCR of about 30 to 40 hours or more as determined by nCLS. In another embodiment the reduced chromium oxide-catalyzed polyolefin is characterized by (i) a modified-Charpy impact strength of about 25 kJ/m² or more and (ii) an ESCR of about 50 to 60 hours as determined by nCLS.

In certain embodiments, polymers of particular embodiments may have a density from about 0.910 g/cm³ to about 0.975 g/cm³, from about 0.930 g/cm³ to about 0.965 g/cm³, from about 0.935 g/cm³ to about 0.965 g/cm³, from about 0.950 g/cm³ to about 0.958 g/cm³, or from about 0.952 g/cm³ to about 0.954 g/cm³

In certain embodiments, polymers of particular embodiments may have flow indices ($I_{21}$) ranging from about 0.1 g/10 min to about 1000 g/10 min. In other embodiments, the polymers may have flow indices ($I_{21}$) ranging from about 0.3 g/10 min to about 300 g/10 min. In yet other embodiments, the polymers may have flow indices ($I_{21}$) ranging from about 0.5 g/10 min to about 50 g/10 min, from about 1 g/10 min to about 20 g/10 min, or from about 2 g/10 min to about 12 g/10 min, or from about 2.5 g/10 min to about 5 g/10 min.

In certain embodiments, polymers of particular embodiments may have a molecular weight distribution ($M_w/M_n$) of from 14 to 34 in one embodiment, from 15 to 30 in another embodiment, from 15 to 28 in yet another embodiment, or from 15 to 25 in yet another embodiment.

In certain embodiments, polymers of particular embodiments may have a melt strength at yield of greater than about 15 cN in one embodiment, greater than about 20 cN in another embodiment, greater than about 25 cN in yet another embodiment, greater than about 30 cN in another embodiment, and greater than about 35 cN in yet another embodiment.

The polymer may be formed into any useful article of manufacture by any suitable means. By way of example, the produced polymers, such as polyethylenes, may be suitable for films made by the cast or blown film extrusion processes. By way of further example, the produced polymers of particular embodiments may be suitable for being formed into an article by blow molding processes. Such processes are well known in the art. Typical blow molded articles may include bottles for household and industrial containers, and include large containers for conveying liquids, drums, and agricultural tanks. By way of further example, the produced polymers of particular embodiments may be suitable for pipe application including those for intended water and natural gas conveyance, and corrugated pipe. By way of further example, the produced polymers may be suitable for geomembrane and liner type applications.

In some embodiments, the polymers may be blended with other polymers and/or additives to form compositions that can be used in articles of manufacture. The blends may be formed into such articles of manufacture by cast film extrusion, blown film extrusion, rotational molding or injection molding processes.

Test Methods

The following test methods should be utilized to obtain the numerical values for certain properties and features as set forth in the claims, e.g. density, productivity, chromium content, or flow indices or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

Modified-Charpy impact strength testing is done on 80 mm×10 mm×10 mm (L×W×T) specimens that are cut and machined from a 10 mm compression molded plaque that has been cooled at 5° C./minute. A razor is used to introduce a 1.6 mm notch into the edge of the specimen at 40 mm (center of specimen). Specimens are cooled in a cold box for 1 hour then removed and tested in less than 5 seconds. The impact tester meets the specification described in ASTM D6110 except the span is set at 40 mm. The test is typically performed over a range of temperatures spanning about 0° C., −15° C., −20° C., and −25° C. Measurements were made over the range of temperatures for the modified tests, and the results reported are those for −20° C. which is near the −18° C. temperature often employed for drop height impact tests often employed for blow molded bottles.

Density values are based on ASTM D-792.

Notched Constant Ligament Stress (nCLS) values at 900 psi actual pressure are based on ASTM F2136. The nCLS values were used as a more precise indication of performance than the Environmental Stress Crack Resistance (ESCR) based on ASTM D1693.

Flow Index ($I_{21}$) values are based on ASTM D1238, run at 190° C., with 21.6 kg weight; the standard designation for that measurement is 190/21.60.

Melt Index ($I_2$) values are based on ASTM D1238, run at 190° C., with 2.16 kg weight; the standard designation for that measurement is 190/2.16.

Melt Strength (MS) values are based on the polymer yield point in the melt strength curve generated with the Rheotens instrument with a starting velocity of 9.8 mm/sec and a velocity at yield in the range of about 32 to 33 mm/sec.

Molecular weight distribution ($M_w/M_n$) was determined using Size Exclusion Chromatography, which was measured using Polymer Laboratories instrument; Model: HT-GPC-220, Columns: Shodex, Run Temp: 140° C., Calibration Standard: traceable to NIST, Solvent: 1,2,4-Trichlorobenzene. BBF: Butyl branching frequency as measured by $^{13}$C-NMR. The value is the number of butyl branches per 1000 carbon atoms.

Examples

The following examples are provided to further illustrate particular embodiments of the invention, and are not intended to limit the scope of the invention.

Catalysts used in the following Examples include: (1) Catalyst A1 and Catalyst A2, which are chromium oxide-based catalysts reduced with diethyl aluminum ethoxide (DEAlE); and (2) Catalyst B (comparative), which is a silyl chromate-based catalysts reduced with DEAlE.

General Catalyst Preparation

Reduced Chromium Oxide Catalysts

The reduced chromium oxide catalysts employed in the Examples were prepared on a commercial scale as follows. A porous silica support containing about 5 weight percent chromium acetate (Grade C35300MS chromium on silica, produced by PQ Corporation), which amounts to about 1 weight percent Cr content, was charged to a fluidized bed heating vessel. There it was heated slowly at a rate of about 50° C. per hour under dry nitrogen up to 200° C. and held at that temperature for about 4 hours. Next it was heated slowly at a rate of about 50° C. per hour under dry nitrogen up to 450° C. and held at that temperature for about 2 hours. The nitrogen stream was then replaced with a stream of dry air and the catalyst composition was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled powder was stored under nitrogen atmosphere until treated with a reducing agent as described below.

In a typical chromium oxide catalyst reduction, the catalyst was placed in a vertical catalyst blender with a helical ribbon agitator under an inert atmosphere. Degassed and dried isopentane solvent was added to adequately suspend the supported catalyst at 37 rpm. DEAlE, available from Akzo Nobel, and obtained as a 25 wt % solution in isopentane, was then added to the surface of the catalyst slurry over a period of about 35 to 50 minutes with the slurry at approximately 45° C. to obtain a selected target aluminum concentration on the finished catalyst. The mixture was further agitated at the controlled rate for about 2 hours. Then the solvent was substantially removed by drying at a jacket temperature of approximately 70° C. and slightly above atmospheric pressure for about 18 hours. The resulting dry, free flowing powder was then stored under nitrogen until used. Catalyst A1 contained 1.092 wt % Al and Catalyst A2 contained 1.280 wt % Al.

Silyl Chromate Catalysts

The silyl chromate-based catalysts employed in the Examples were prepared on a commercial scale as follows. Porous silica support (Grade Sylopol 955 chromium on silica, produced by Davison Catalyst division of W. R. Grace and Co.) was charged to a fluidized bed heating vessel. There it was heated slowly at a rate of about 100° C. per hour under dry nitrogen up to 325° C. and held at that temperature for about 0 to 2 hours. The nitrogen stream was then replaced with a stream of dry air and the silica support was heated slowly at a rate of about 100° C. per hour to 600° C. where it was activated for about 4 hours. The calcined support was then cooled with dry air (at ambient temperature) to about 300° C. and further cooled from 300° C. to room temperature with dry nitrogen (at ambient temperature). The resulting cooled powder was stored under nitrogen atmosphere until treated with a chromium compound and then a reducing agent as described below.

In supporting the silyl chromate compound on the silica, the support was placed in a vertical catalyst blender with a helical ribbon agitator under an inert atmosphere. Degassed and dried isopentane solvent was added to adequately suspend the supported catalyst at 30-40 rpm. The resulting mixture was stirred and heated to about 45° C. Then 3.15 kilograms of bis(triphenylsilyl) chromate was charged for every 100 kilograms of silica. This was stirred at about 45° C. for 10 hours. A 25 wt % solution of DEAlE in isopentane was then added to the surface of the catalyst slurry over a period of about 0.1 to 10 minutes with the slurry at approximately 45° C. to obtain a selected molar ratio of DEAlE/Cr. The mixture was further agitated for about 2 hours. Then the solvent was substantially removed by drying at a jacket temperature of approximately 60-70° C. and slightly above atmospheric pressure for about 24 hours. The resulting dry, free flowing powder was then stored under nitrogen until used. Catalyst B had a mole ratio of Al to Cr of about 1.5

Polymerization

Ethylene/1-hexene copolymers were produced in a pilot-scale gas-phase reactor according to the following procedure. Seventeen different runs were performed, labeled Runs 1-17. Runs 1 and 2 used Catalyst B. Runs 3-6 and 13-17 used Catalyst A1. Runs 7-12 used Catalyst A2.

The following provides fluidized-bed gas-phase examples of particular embodiments. A gas-phase fluidized-bed polymerization reactor of the UNIPOL™ process design having a nominal diameter of 14 inches was used for the continuous production of high-density ethylene-hexene copolymer. In these cases, the cycle gas blower was situated upstream of the cycle gas heat exchanger in the gas recirculation loop but the two could have been reversed to reduce the gas temperature where it entered the heat exchanger. The cycle pipe was about 2 inches in diameter and its flow rate was manipulated by a ball valve in the cycle line to control the superficial gas velocity in the fluid bed at the desired rate. Monomers and gaseous components were added upstream of the cooler before the blower, at the blower impeller or after the blower. Dry catalyst was continuously added in discrete small aliquots via ⅛ inch tube directly to the fluidized bed at a height about 0.1 to 2 m above the distributor plate and most preferably at about the 0.2 to 1.2 m range using a nitrogen carrier gas flow at a location about 15 to 50% of the reactor diameter. Polymer product was withdrawn periodically from the reactor through a discharge isolation tank in aliquots of about 0.2 to 5 kg to maintain a desired approximate average fluidized bed level or weight. A dilute stream of oxygen in nitrogen (1000 ppmv) was available and used on some experiments to manipulate the polymer molecular weight and molecular weight distribution.

Table 1 below summarizes the respective gas concentrations and reactor variables as well as densities, flow indices ($I_{21}$), comonomer content, modified-Charpy impact strengths (mCIS), and notched constant ligament stress (nCLS) of the produced polymers.

TABLE 1

Gas Phase Conditions and Results

| | Run | | | | | |
|---|---|---|---|---|---|---|
| | 1 | 2 | 3 | 4 | 5 | 6 |
| Catalyst | B | B | A1 | A1 | A1 | A1 |
| Al wt % or (Al/Cr Mole Ratio) | (1.50) | (1.50) | 1.092 | 1.092 | 1.092 | 1.092 |
| Reactor Bed Temperature, ° C. | 96.4 | 95.5 | 107.5 | 107.0 | 100.0 | 100.0 |
| Ethylene Partial Pressure, psi | 224.6 | 224.9 | 225.0 | 224.7 | 224.8 | 224.7 |
| $H_2/C_2$ Cycle Gas Mole Ratio | 0.050 | 0.050 | 0.048 | 0.010 | 0.010 | 0.010 |
| $C_6/C_2$ Cycle Gas Mole Ratio | 0.000531 | 0.000847 | 0.000734 | 0.000591 | 0.000961 | 0.000959 |
| $C_6/C_2$ Weight Flow Ratio | 0.00261 | 0.00342 | 0.00465 | 0.00596 | 0.00541 | 0.00566 |
| Oxygen to Ethylene Mole Feed Ratio, ppbv | 20.1 | 20.1 | 19.1 | 11.6 | 104.2 | 102.2 |
| Resin Average Residence Time, hr | 4.86 | 4.91 | 5.01 | 4.19 | 4.26 | 3.27 |
| Flow Index ($I_{21}$), dg/min | 3.18 | 3.52 | 4.06 | 3.02 | 2.61 | 3.32 |
| Melt Index ($I_5$), dg/min | 0.124 | 0.144 | 0.224 | 0.162 | 0.118 | 0.134 |
| MFR ($I_{21}/I_5$) | 25.6 | 24.4 | 18.1 | 18.6 | 22.2 | 24.7 |
| Product Density, g/cc | 0.9546 | 0.9536 | 0.9529 | 0.9528 | 0.9533 | 0.9539 |
| Mn | 13,830 | 9,480 | 13,930 | 15,650 | 12,310 | 11,250 |
| Mw | 267,020 | 221,870 | 233,770 | 249,240 | 215,460 | 249,100 |
| Mz | 1,510,300 | 1,176,800 | 1,159,800 | 1,231,600 | 926,900 | 1,292,600 |
| Mz + 1 | 3,655,800 | 2,695,500 | | 2,254,700 | 2,012,500 | 2,293,000 |
| Mw/Mn | 19.31 | 23.40 | 16.78 | 15.93 | 17.50 | 22.14 |
| Mz/Mw | 5.66 | 5.30 | 4.96 | 4.94 | 4.30 | 5.19 |
| C4 branching per 1000 Chain Carbons | 0.32 | 0.40 | 0.47 | 0.50 | 0.51 | 0.49 |
| nCLS @ 900 psi actual | 20.7 | 27.5 | 30.4 | 33.3 | 51.4 | 53.0 |
| Modified-Charpy Impact, −20° C. | 26.0 | 21.2 | 22.7 | 28.0 | 24.4 | 22.4 |

| | Run | | | | | |
|---|---|---|---|---|---|---|
| | 7 | 8 | 9 | 10 | 11 | 12 |
| Catalyst | A2 | A2 | A2 | A2 | A2 | A2 |
| Al wt % or (Al/Cr Mole Ratio) | 1.280 | 1.280 | 1.280 | 1.280 | 1.280 | 1.280 |
| Reactor Bed Temperature, ° C. | 104.0 | 104.0 | 103.7 | 101.8 | 100.5 | 100.7 |
| Ethylene Partial Pressure, psi | 224.9 | 225.0 | 225.2 | 224.9 | 225.0 | 225.1 |
| $H_2/C_2$ Cycle Gas Mole Ratio | 0.010 | 0.010 | 0.010 | 0.010 | 0.012 | 0.010 |
| $C_6/C_2$ Cycle Gas Mole Ratio | 0.000689 | 0.000574 | 0.00212 | 0.00223 | 0.00129 | 0.00155 |
| $C_6/C_2$ Weight Flow Ratio | 0.00447 | 0.00471 | 0.00865 | 0.00885 | 0.00599 | 0.00658 |
| Oxygen to Ethylene Mole Feed Ratio, | 20.1 | 31.9 | 20.1 | 20.1 | 30.1 | 20.1 |

TABLE 1-continued

Gas Phase Conditions and Results

| ppbv | | | | | | |
|---|---|---|---|---|---|---|
| Resin Average Residence Time, hr | 3.90 | 3.52 | 3.87 | 3.89 | 3.63 | 3.53 |
| Flow Index ($I_{21}$), dg/min | 3.01 | 2.81 | 3.35 | 3.28 | 2.61 | 2.75 |
| Melt Index ($I_5$), dg/min | 0.141 | 0.127 | 0.159 | 0.144 | 0.105 | 0.112 |
| MFR ($I_{21}/I_5$) | 21.4 | 22.2 | 21.1 | 22.8 | 24.8 | 24.6 |
| Product Density, g/cc | 0.9537 | 0.9535 | 0.9498 | 0.9509 | 0.9522 | 0.9521 |
| Mn | 12,860 | 14,410 | 13,390 | 12,490 | 12,570 | 12,680 |
| Mw | 303,770 | 265,060 | 279,140 | 254,170 | 305,040 | 281,090 |
| Mz | 1,891,600 | 1,373,300 | 1,566,700 | 1,260,500 | 1,815,900 | 1,604,200 |
| Mz + 1 | 3,401,000 | 2,806,500 | 3,255,200 | 2,722,800 | 3,719,300 | 2,941,300 |
| Mw/Mn | 23.62 | 18.39 | 20.85 | 20.35 | 24.27 | 22.17 |
| Mz/Mw | 6.23 | 5.18 | 5.61 | 4.96 | 5.95 | 5.71 |
| C4 branching per 1000 Chain Carbons | 0.43 | 0.44 | 0.99 | 0.91 | 0.66 | 0.69 |
| nCLS @ 900 psi actual | 41.3 | 40.8 | 181.1 | 136.3 | 70.2 | 107.1 |
| Modified-Charpy Impact, −20° C. | 26.7 | 27.7 | 19.4 | 20.0 | 24.1 | 22.3 |

| | Run | | | | |
|---|---|---|---|---|---|
| | 13 | 14 | 15 | 16 | 17 |
| Catalyst | A1 | A1 | A1 | A1 | A1 |
| Al wt % or (Al/Cr Mole Ratio) | 1.092 | 1.092 | 1.092 | 1.092 | 1.092 |
| Reactor Bed Temperature, ° C. | 100.0 | 101.0 | 101.0 | 101.0 | 97.0 |
| Ethylene Partial Pressure, psi | 224.3 | 225.4 | 225.2 | 225.0 | 225.1 |
| $H_2/C_2$ Cycle Gas Mole Ratio | 0.010 | 0.030 | 0.014 | 0.010 | 0.010 |
| $C_6/C_2$ Cycle Gas Mole Ratio | 0.000936 | 0.00105 | 0.00103 | 0.00109 | 0.00145 |
| $C_6/C_2$ Weight Flow Ratio | 0.00444 | 0.00433 | 0.00443 | 0.00457 | 0.00520 |
| Oxygen to Ethylene Mole Feed Ratio, ppbv | 20.1 | 20.1 | 20.1 | 10.1 | 90.1 |
| Resin Average Residence Time, hr | 2.19 | 2.17 | 2.18 | 2.16 | 2.17 |
| Flow Index ($I_{21}$), dg/min | 2.96 | 3.61 | 3.47 | 2.81 | 3.33 |
| Melt Index ($I_5$), dg/min | 0.114 | 0.148 | 0.138 | 0.108 | 0.116 |
| MFR ($I_{21}/I_5$) | 26.0 | 24.4 | 25.1 | 26.0 | 28.7 |
| Product Density, g/cc | 0.9537 | 0.9540 | 0.9537 | 0.9528 | 0.9538 |
| Mn | 11,430 | 12,690 | 11,980 | 11,460 | 9,870 |
| Mw | 207,320 | 239,310 | 197,520 | 246,850 | 201,930 |
| Mz | 905,600 | 1,191,400 | 864,900 | 1,280,100 | 957,900 |
| Mz + 1 | 1,829,800 | 2,548,100 | 1,904,900 | | 1,938,800 |
| Mw/Mn | 18.14 | 18.86 | 16.49 | 21.54 | 20.46 |
| Mz/Mw | 4.37 | 4.98 | 4.38 | 5.19 | 4.74 |
| C4 branching per 1000 Chain Carbons | 0.56 | 0.60 | 0.58 | 0.54 | 0.67 |
| nCLS @ 900 psi actual | 45.2 | 44.9 | 49.4 | 72.1 | 75.6 |
| Modified-Charpy Impact, −20° C. | 23.9 | 23.1 | 21.4 | 23.0 | 17.3 |

For comparative purposes, Table 2 contains measured polymer properties of various competitors' LPBM products, labeled Product A, Product B, and Product C, respectively. Product A, Product B, and Product C are each chromium-catalyzed polyolefin.

TABLE 2

Comparative Polymer Properties

| | Competitor LPBM Product A | Competitor LPBM Product B | Competitor LPBM Product C |
|---|---|---|---|
| Flow Index ($I_{21}$), dg/min | 1.95 | 6.24 | 2.79 |
| Melt Index ($I_5$), dg/min | 0.096 | 0.304 | 0.089 |
| MFR ($I_{21}/I_5$) | 20.3 | 20.5 | 31.5 |
| Product Density, g/cc | 0.9549 | 0.9459 | 0.9521 |
| Mn | 23740 | 15750 | 13,040 |
| Mw | 246920 | 238590 | 271,290 |
| Mz | 1084600 | 1400800 | 1,597,900 |
| Mz + 1 | | | |
| Mw/Mn | 10.4 | 15.15 | 20.80 |
| Mz/Mw | 4.39 | 5.87 | 5.89 |
| C4 branching per 1000 Chain Carbons | 0 | 1.55 | 0.56 |
| C2 branching per 1000 Chain Carbons | | 0.36 | 0.17 |

TABLE 2-continued

Comparative Polymer Properties

| | Competitor LPBM Product A | Competitor LPBM Product B | Competitor LPBM Product C |
|---|---|---|---|
| nCLS @ 900 psi actual | 8.5 | 54.5 | 48 |
| Modified-Charpy Impact, −20° C. | 50.3 | 10.5 | 20.3 |

Figure 2:
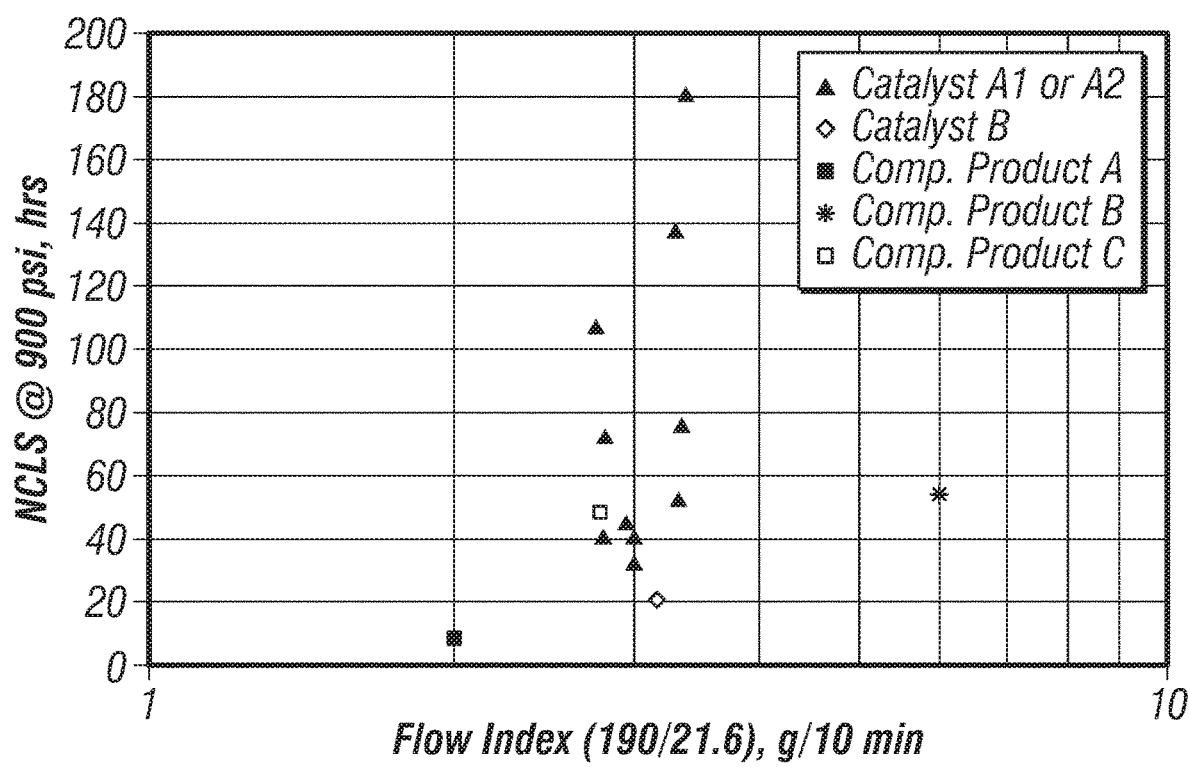
FIG. 2 is a plot of nCLS versus flow index for certain embodiments in a gas-phase reactor.

FIG. 1 is a plot of modified-Charpy impact strengths versus flow index for the produced polymers. FIG. 2 is a plot of nCLS versus flow index for the produced polymers. FIGS. 1 and 2 further include data points for the competitors' products to compare the properties of the produced polyethylene with these commercially available polymers. These plots indicate that flow index more strongly influences impact properties than it influences nCLS. In particular, lower flow index improved impact properties of the produced polymers. However, polymers with improved impact properties did so at the expense of nCLS.

Figure 3:
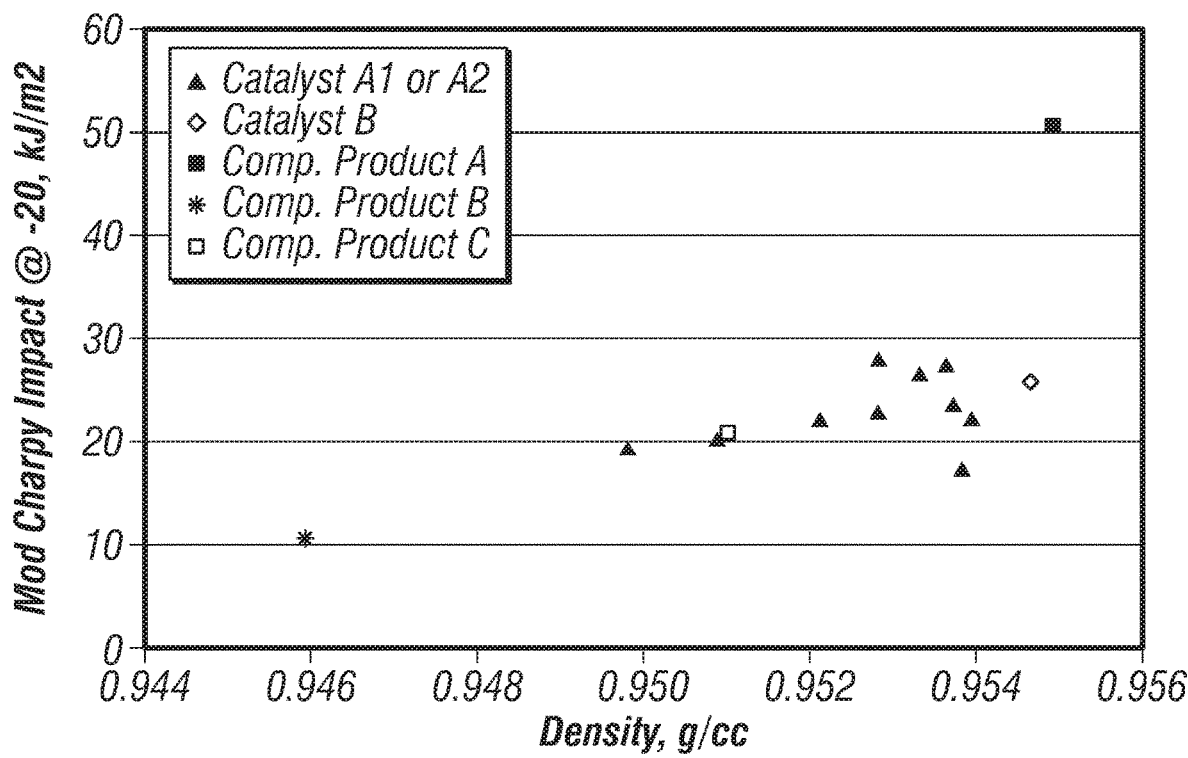
FIG. 3 is a plot of modified-Charpy impact strengths versus density for certain embodiments in a gas-phase reactor.
Figure 4:
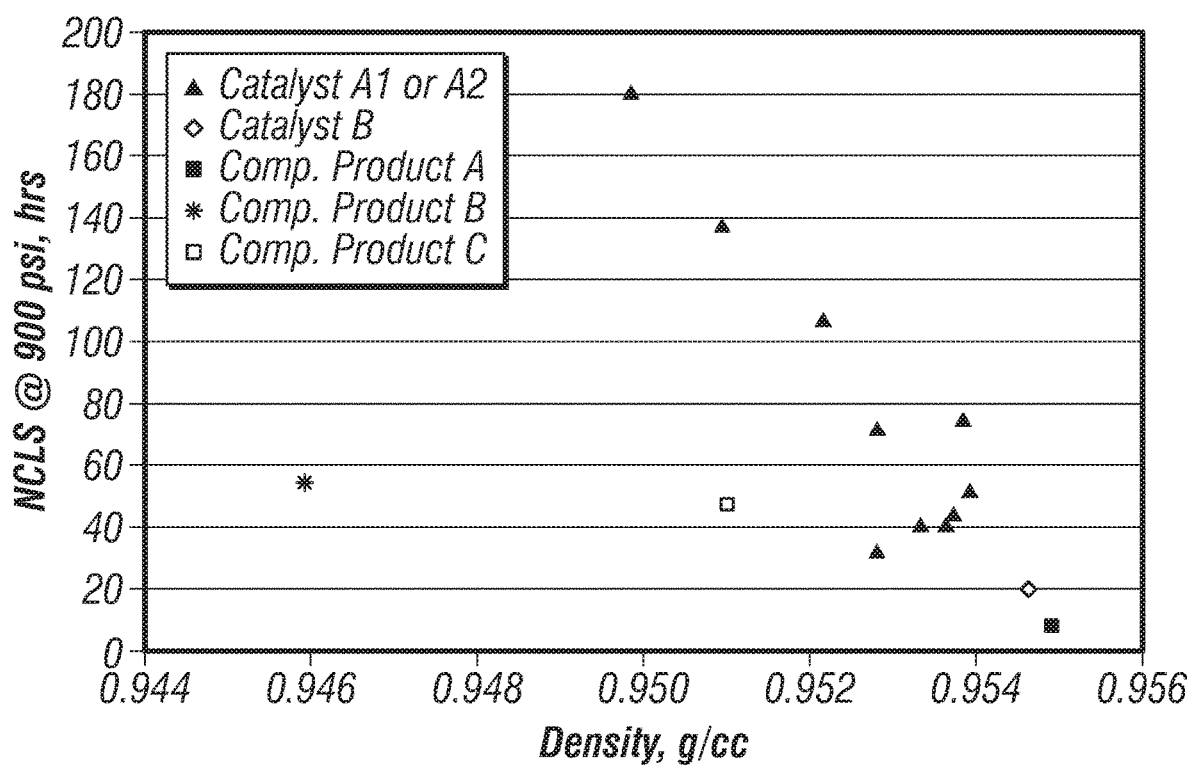
FIG. 4 is a plot of nCLS versus density for certain embodiments in a gas-phase reactor.

FIG. 3 is a plot of modified-Charpy impact strengths versus density for the produced polymers. FIG. 4 is a plot of nCLS versus density for the produced polymers. FIGS. 3 and 4 further include data points for the competitors' products to compare the properties of the produced polyethylene with these commercially available polymers. These plots indicate that density more strongly influences nCLS than it influences impact properties.

Figure 5:
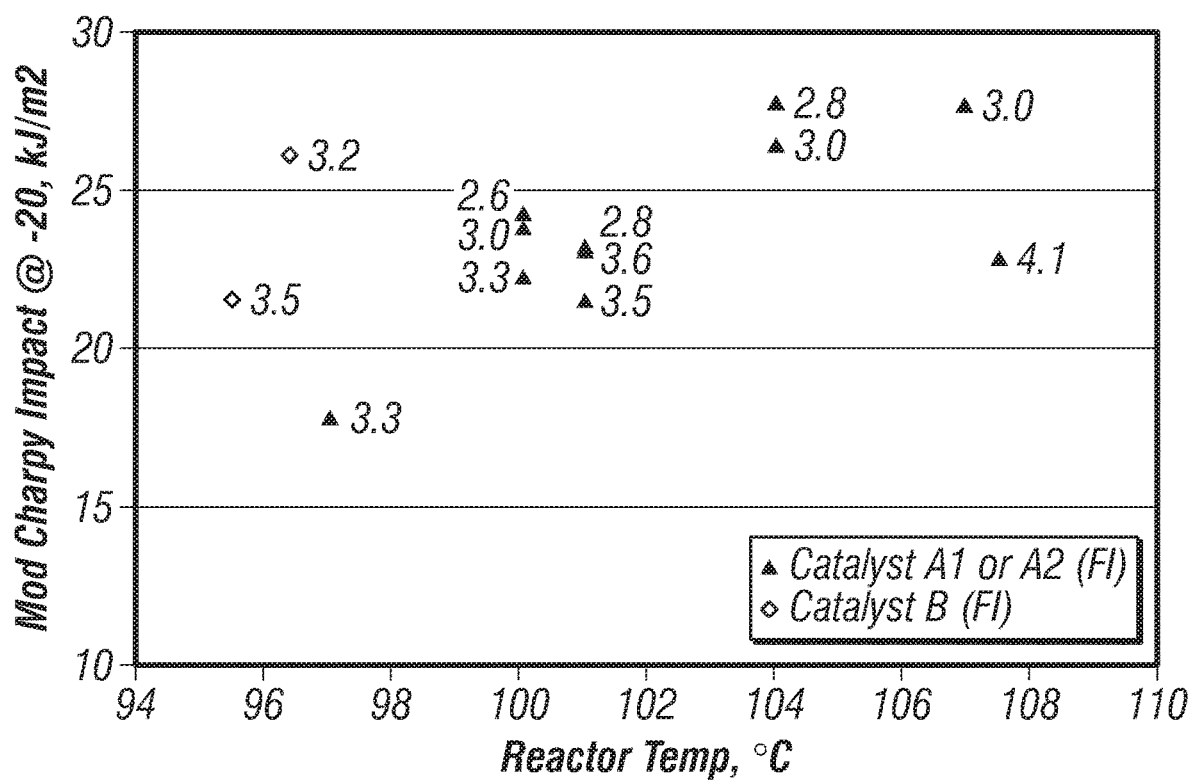
FIG. 5 is a plot of modified-Charpy impact strengths versus reactor temperature for certain embodiments in a gas-phase reactor.
Figure 6:
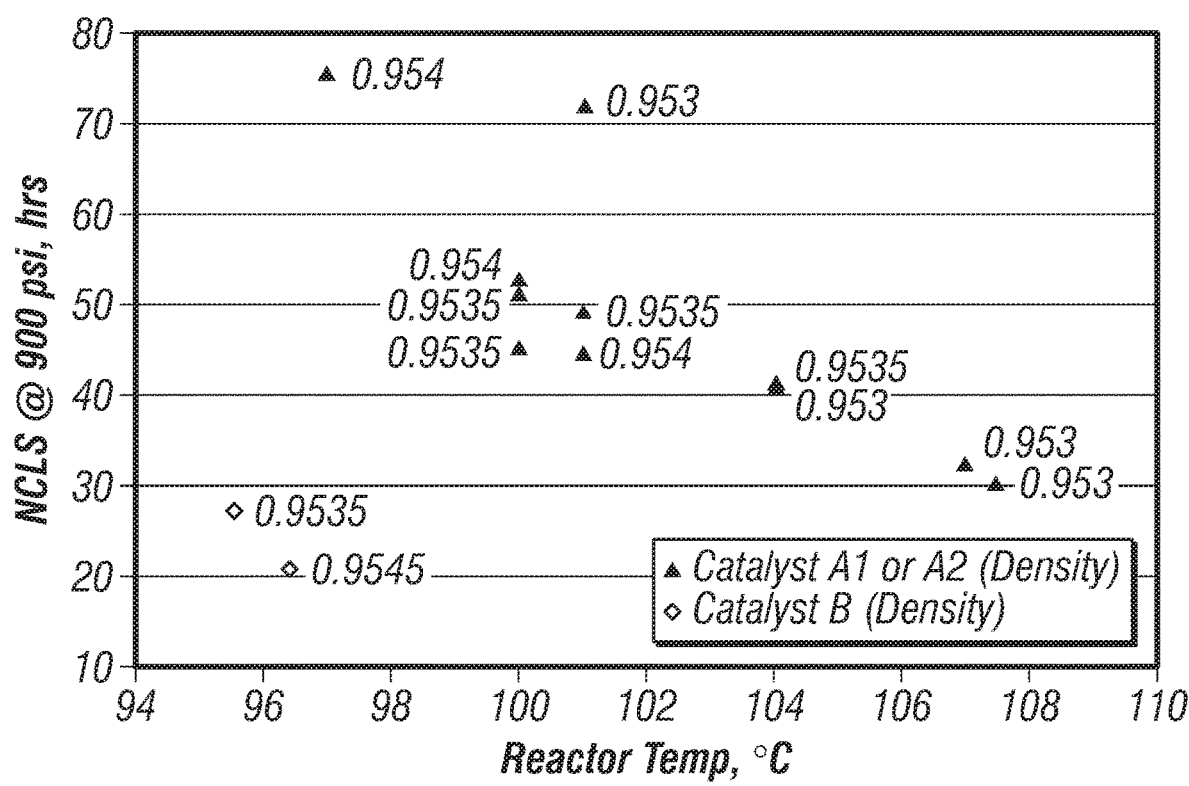
FIG. 6 is a plot of nCLS reactor temperature for certain embodiments in a gas-phase reactor.

FIG. 5 is a plot of modified-Charpy impact strengths versus reactor temperature for the produced polymers. FIG. 6 is a plot of nCLS versus reactor temperature for the produced polymers. The density range of the polymers shown on FIGS. 5 and 6 was from 0.9530 g/cc to 0.9540 g/cc. These plots indicate that impact properties were found to improve with increasing reactor temperature while nCLS decreased with increasing reactor temperature. However, Catalyst A1 and A2 had significantly better nCLS than Catalyst B.

Figure 7:
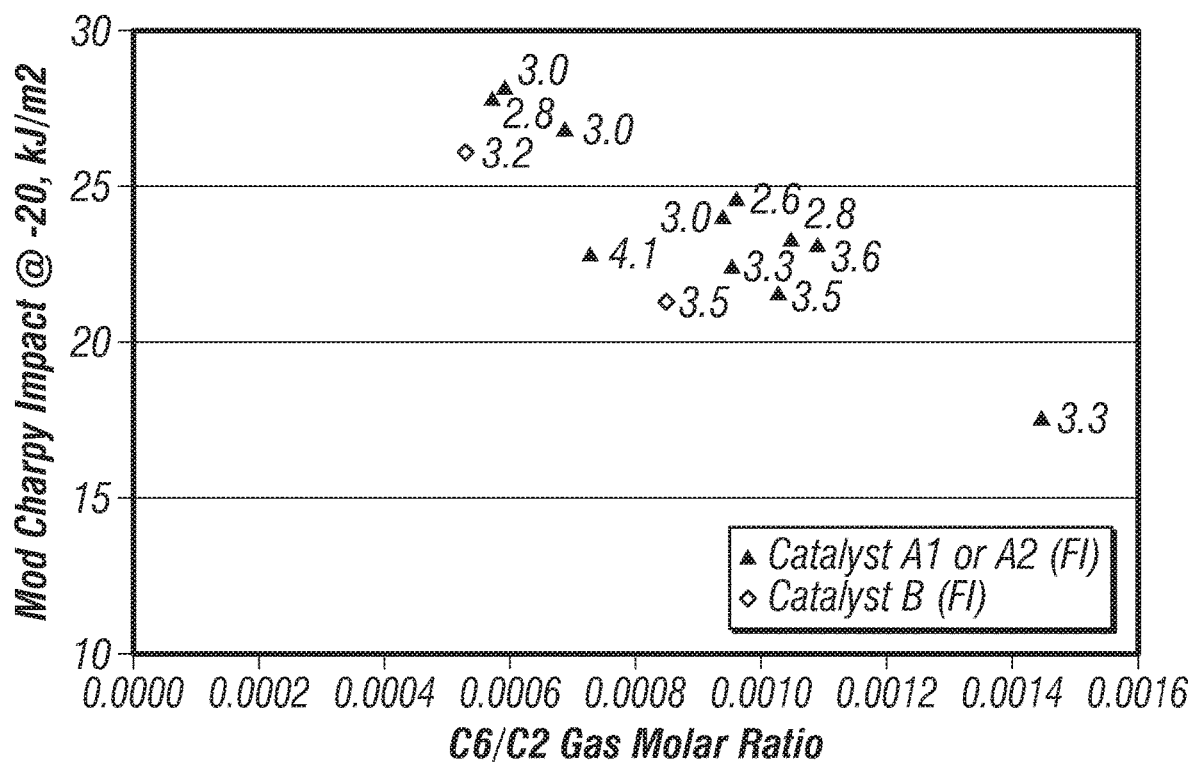
FIG. 7 is a plot of modified-Charpy impact strengths versus co-monomer gas molar ratio for certain embodiments in a gas-phase reactor.
Figure 8:
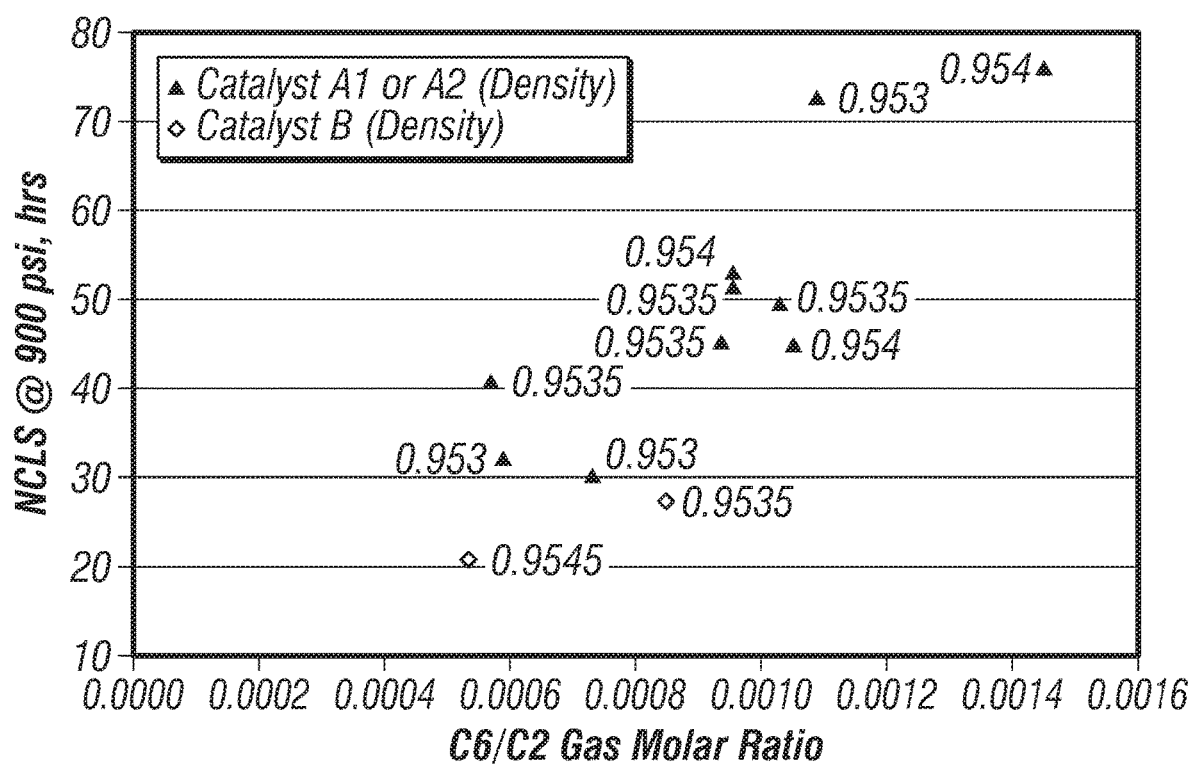
FIG. 8 is a plot of nCLS versus co-monomer gas molar ratio for certain embodiments in a gas-phase reactor.

FIG. 7 is a plot of modified-Charpy impact strengths versus $C_6/C_2$ gas molar ratio for the produced polymers. FIG. 8 is a plot of nCLS versus $C_6/C_2$ gas molar ratio for the produced polymers. The density range of the polymers shown on FIGS. 7 and 8 was from 0.9530 g/cc to 0.9540 g/cc. These plots indicate that the $C_6/C_2$ gas molar ratio strongly influenced both modified-Charpy impact strength and nCLS. For impact properties, less co-monomer and higher reaction temperatures provided the best conditions for modified-Charpy impact strength while high levels of the co-monomer and lower reaction temperatures provided the best conditions for nCLS.

Figure 9:
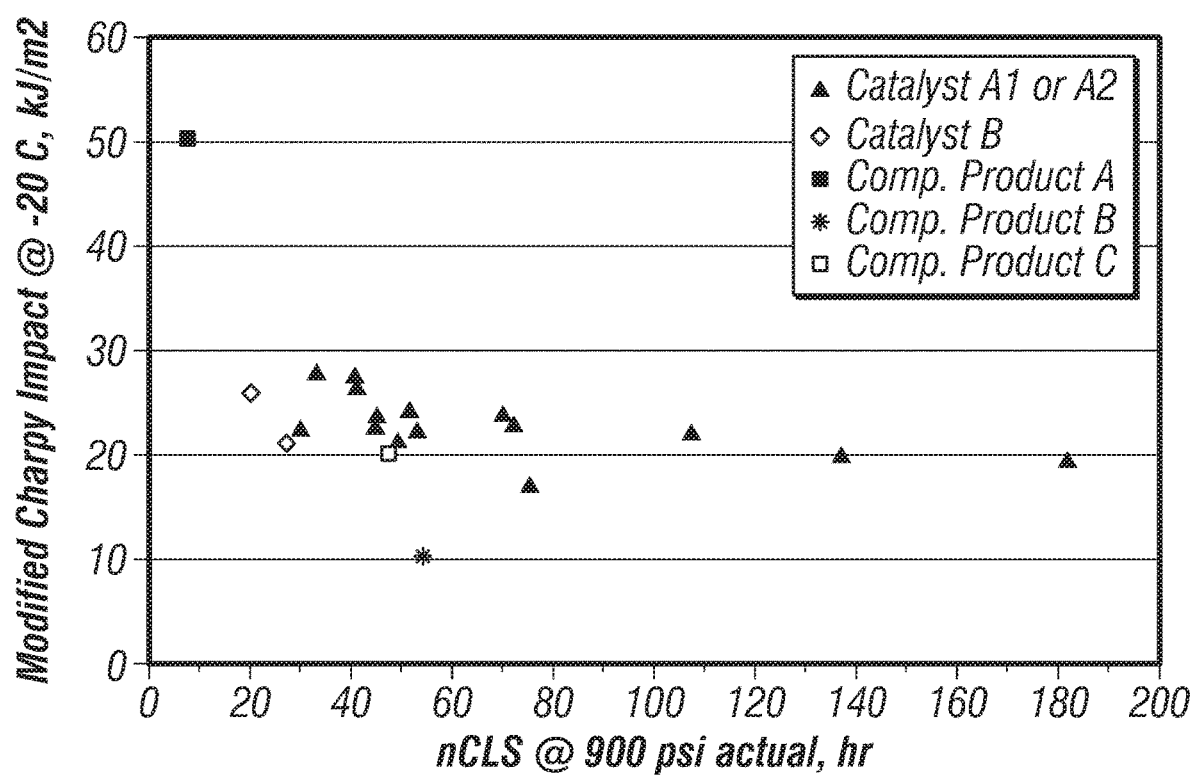
FIG. 9 is a plot of modified-Charpy impact strengths versus nCLS for the produced polymers.

FIG. 9 is a plot of modified-Charpy impact strengths versus nCLS for the produced polymers. FIG. 9 further includes data points for the competitors' products to compare the properties of the produced polyethylene with these commercially available polymers. As illustrated, Catalysts A1 and A2 produced polymers having improved nCLS and modified-Charpy impact strengths.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A method of producing a polyolefin comprising:
    contacting a reaction mixture and a reduced chromium oxide catalyst in a gas-phase reactor to produce the polyolefin, wherein the reaction mixture comprises ethylene and a co-monomer, and wherein the polyolefin is characterized by (i) a modified-Charpy impact strength of about 20 kJ/m$^2$ or more, (ii) an equivalent stress cracking resistance of about 50 hours or more determined by notched constant ligament stress, (iii) a density of 0.952 g/cc to 0.958 g/cc and (iv) a flow index ($I_{21}$) of about 2 dg/min to 5 dg/min.

2. The method of claim 1 wherein the modified-Charpy impact strength of the polyolefin is about 22 kJ/m$^2$ to about 24 kJ/m$^2$.

3. The method of claim 1 wherein the equivalent stress cracking resistance of the polyolefin is about 60 hours or more.

4. The method of claim 1 wherein the reduced chromium oxide catalyst has been reduced with an alkyl aluminum alkoxide.

5. The method of claim 4 wherein the alkyl aluminum alkoxide comprises diethyl aluminum ethoxide.

6. The method of claim 1 wherein the co-monomer comprises an alpha olefin comprising from 3 carbons to 20 carbons.

7. The method of claim 1 wherein reaction temperature in the gas-phase reactor is increased to decrease comonomer content of the polyolefin.

8. The method of claim 1 wherein reaction temperature in the gas-phase reactor is decreased to increase comonomer content of the polyolefin.

9. The method of claim 7 wherein the changing the reaction temperature does not substantially change density of the polyolefin.

10. The method of claim 1 wherein the polyolefin is characterized by a melt flow index ranging from about 0.1 g/10 min to about 1000 g/10 min.

11. A composition comprising:
    a reduced chromium oxide-catalyzed polyolefin, wherein the reduced chromium oxide-catalyzed polyolefin is characterized by (i) a modified-Charpy impact strength of about 22 kJ/m$^2$ or more, (ii) an equivalent stress cracking resistance of about 30 hours or more determined by notched constant ligament stress, (iii) a density of about 0.952 g/cc to 0.958 g/cc and (iv) a flow index ($I_{21}$) of about 2 dg/min to 5 dg/min.

12. A composition comprising:
    a chromium-catalyzed polyolefin, wherein the chromium-catalyzed polyolefin is characterized by (i) a modified-Charpy impact strength of about 20 kJ/m$^2$ or more, (ii) an equivalent stress cracking resistance of about 50 hours or more determined by notched constant ligament stress, (iii) a density of 0.952 g/cc to 0.958 g/cc and (iv) a flow index ($I_{21}$) of about 2 dg/min to 5 dg/min.

13. The composition of claim 12 wherein the equivalent stress cracking resistance of the chromium-catalyzed polyolefin is about 60 hours or more.

14. The composition of claim 12 wherein the modified-Charpy impact strength of the chromium-catalyzed polyolefin is about 22 kJ/m$^2$ to 24 about kJ/m$^2$.

15. The composition of claim 14 wherein the modified-Charpy impact strength of the chromium-catalyzed polyolefin is about 25 kJ/m$^2$ or more.

16. The composition of claim 14 wherein the equivalent stress cracking resistance of the chromium-catalyzed polyolefin is about 60 hours or more.

17. The method of claim 1 wherein the co-monomer is a hexene co-monomer and amount of the hexene comonomer incorporated into the polyolefin is 0.3 to 1.2 butyl branches per 1000 chain carbons.

18. The composition of claim 11, wherein the reduced chromium-catalyzed polyolefin is produced by a reaction mixture comprising ethylene and a hexene co-monomer and wherein the amount of the hexene comonomer incorporated into the reduced chromium-catalyzed polyolefin is 0.3 to 1.2 butyl branches per 1000 chain carbons.

19. The composition of claim 14, wherein the chromium-catalyzed polyolefin is produced by a reaction mixture comprising ethylene and a hexene co-monomer and wherein the amount of the hexene comonomer incorporated into the chromium-catalyzed polyolefin is 0.3 to 1.2 butyl branches per 1000 chain carbons.

* * * * *